(12) United States Patent
Shingai

(10) Patent No.: US 9,052,248 B2
(45) Date of Patent: Jun. 9, 2015

(54) METHOD FOR MEASURING STABLE-STATE TENSION OF POWER TRANSMISSION BELT

(71) Applicant: BANDO CHEMICAL INDUSTRIES, LTD., Kobe (JP)

(72) Inventor: Yuki Shingai, Kobe (JP)

(73) Assignee: BANDO CHEMICAL INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/301,886

(22) Filed: Jun. 11, 2014

(65) Prior Publication Data

US 2014/0290387 A1    Oct. 2, 2014

Related U.S. Application Data

(63) Continuation of application No. PCT/JP2013/003401, filed on May 29, 2013.

(30) Foreign Application Priority Data

Jun. 1, 2012    (JP) .................................. 2012-126461

(51) Int. Cl.
| | |
|---|---|
| *G01N 3/56* | (2006.01) |
| *G01L 3/02* | (2006.01) |
| *F16G 5/00* | (2006.01) |
| *G01L 1/26* | (2006.01) |
| *G01M 13/02* | (2006.01) |
| *B29D 29/00* | (2006.01) |
| *F16G 5/20* | (2006.01) |
| *F16H 7/00* | (2006.01) |
| *G01L 5/10* | (2006.01) |

(Continued)

(52) U.S. Cl.
CPC ............... *G01L 1/26* (2013.01); *G01M 13/023* (2013.01); *B29D 29/00* (2013.01); *F16G 5/20* (2013.01); *F16H 7/00* (2013.01); *G01L 5/10* (2013.01); *F16G 5/10* (2013.01); *F16H 7/023* (2013.01)

(58) Field of Classification Search
CPC ............. G01N 3/18; G01N 3/14; G01N 3/08; G01M 13/023
USPC ............ 73/7, 114.77, 862.194; 474/263, 260, 474/266; 156/137
See application file for complete search history.

(56) References Cited

U.S. PATENT DOCUMENTS

| 4,522,614 A * | 6/1985 | Matsuoka et al. ............ 474/260 |
| 4,904,232 A * | 2/1990 | Kitahama et al. ............ 474/238 |

(Continued)

FOREIGN PATENT DOCUMENTS

| JP | 06-249725 A | 9/1994 |
| JP | 2007-024815 A | 2/2007 |

(Continued)

*Primary Examiner* — Lisa Caputo
*Assistant Examiner* — Jonathan Dunlap
(74) *Attorney, Agent, or Firm* — Knobbe Martens Olson & Bear LLP

(57) ABSTRACT

Disclosed is a method for measuring a stable-state tension of a power transmission belt in which a temperature of an endless power transmission belt B including a belt body made of rubber in which a cord made of an organic fiber is embedded, is made higher than a glass transition temperature of the organic fiber forming the cord, with the endless power transmission belt B wound around a plurality of pulleys, and thereafter, a belt tension of the power transmission belt wound around the plurality of pulleys is measured as a stable-state tension.

14 Claims, 13 Drawing Sheets

(51) Int. Cl.
 *F16G 5/10* (2006.01)
 *F16H 7/02* (2006.01)

(56) References Cited

U.S. PATENT DOCUMENTS 5,501,643 A * 3/1996 Isshiki et al. ................. 474/268
5,609,541 A * 3/1997 Tachibana et al. ............ 474/205
6,131,435 A * 10/2000 Mishima et al. .................... 73/7
2006/0079362 A1 * 4/2006 Tomobuchi et al. .......... 474/205

FOREIGN PATENT DOCUMENTS

| JP | 2009-091681 A | 4/2009 |
| JP | 2012-041973 A | 3/2012 |

* cited by examiner

TIME PASSED AFTER REMOVAL FROM MOLD (HOURS)

METHOD FOR MEASURING STABLE-STATE TENSION OF POWER TRANSMISSION BELT

CROSS-REFERENCE TO RELATED APPLICATIONS

This is a continuation of International Application No. PCT/JP2013/003401 filed on May 29, 2013, which claims priority to Japanese Patent Application No. 2012-126461 filed on Jun. 1, 2012. The entire disclosures of these applications are incorporated by reference herein.

BACKGROUND

The present disclosure relates to methods for measuring a stable-state tension of a power transmission belt and devices for measuring the stable-state tension, and methods for forming a power transmission belt using the methods and the devices.

In belt transmission systems for driving accessories of automobiles, a V-ribbed belt is wrapped around a crank shaft pulley, a power steering pulley, an air conditioning pulley, a water pump pulley, and an AC generator pulley, for example, and a predetermined belt tension is applied to the V-ribbed belt by an auto tensioner (for example, Patent Document 1).

Patent Document 1 is Japanese Unexamined Patent Publication No. 2012-41973.

SUMMARY

The present disclosure is a method for measuring a stable-state tension of a power transmission belt, wherein a belt temperature of an endless power transmission belt including a belt body made of rubber in which a cord made of an organic fiber is embedded, is made higher than a glass transition temperature of the organic fiber forming the cord, with the endless power transmission belt wound around a plurality of pulleys, and thereafter, a belt tension of the power transmission belt wound around the plurality of pulleys is measured as a stable-state tension.

The present disclosure is a device for measuring a stable-state tension of a power transmission belt which is used to measure a stable-state tension of an endless power transmission belt including a belt body made of rubber in which a cord made of an organic fiber is embedded, including: a heating bath at which a temperature-control mechanism is provided; a plurality of pulleys provided in the heating bath such that the power transmission belt can be wound around the plurality of pulleys; and a belt tension detection mean configured to detect a belt tension of the power transmission belt wound around the plurality of pulleys.

The present disclosure is a method for forming an endless power transmission belt including a belt body made of rubber in which a cord made of an organic fiber is embedded, the method including: a material positioning step in which the cord is helically wound around an outer circumference of a cylindrical mold, with a predetermined tension applied to the cord, and thereafter an uncrosslinked rubber composition is wound around the cylindrical mold; a vulcanization-molding step in which the cord and the uncrosslinked rubber composition positioned on the cylindrical mold in the material positioning step are heated and pressed to vulcanize and mold the cord and the uncrosslinked rubber composition into a cylindrical belt slab; and a stable-state tension inspection step in which a belt temperature of the power transmission belt formed from the belt slab obtained in the vulcanization-molding step is made higher than a glass transition temperature of the organic fiber forming the cord, with the power transmission belt wound around a plurality of pulleys, and thereafter a belt tension of the power transmission belt wound around the plurality of pulleys is measured as a stable-state tension.

DETAILED DESCRIPTION

An embodiment will be described in detail based on the drawings.

(V-Ribbed Belt B)

Figure 1:
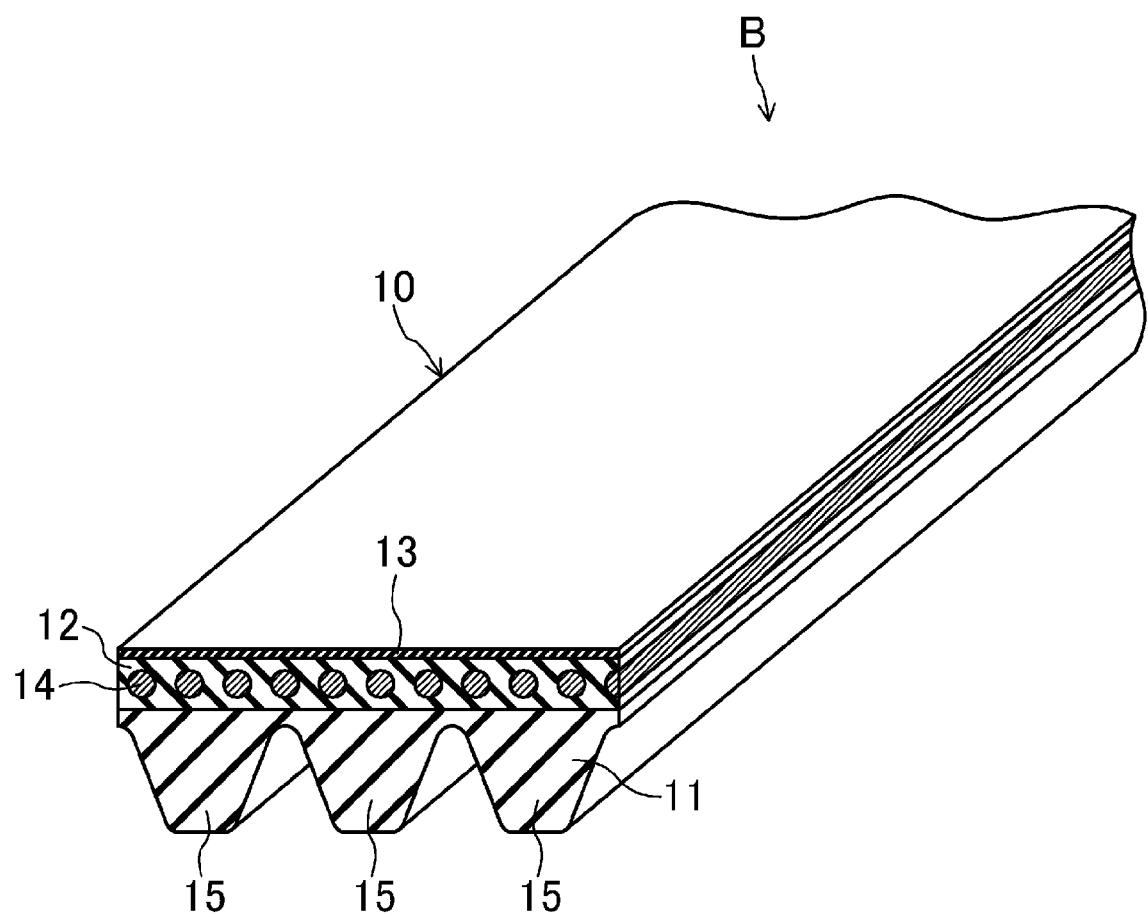
FIG. 1 is an oblique view of a V-ribbed belt according to an embodiment.

FIG. 1 shows a V-ribbed belt B (a power transmission belt) according to an embodiment. The V-ribbed belt B of the present embodiment is an endless V-ribbed belt that is used, for example, in an accessory belt transmission system provided in an engine compartment of an automobile. The V-ribbed belt B of the present embodiment has a length of 700 to 3000 mm, a width of 10 to 36 mm, and a thickness of 4.0 to 5.0 mm, for example. In the present embodiment, the V-ribbed belt B is a power transmission belt, but is not limited to the power transmission belt, and may be a flat belt, a V belt, and a toothed belt.

The V-ribbed belt B of the embodiment includes a three-layered V-ribbed belt body 10 made of rubber which includes a compression rubber layer 11 constituting an inner surface of the belt coming in contact with a pulley, an intermediate adhesion rubber layer 12, and a backside rubber layer 13 constituting an outer surface of the belt. A cord 14 arranged so as to form a helical pattern at a predetermined pitch in a width direction of the belt is embedded in the adhesion rubber layer 12.

The compression rubber layer 11 includes a plurality of V-shaped ribs 15 protruding from the inner surface of the belt. Each of the plurality of V-shaped ribs 15 is in the shape of a rib extending in the longitudinal direction of the belt, and having an approximately inverted triangular cross-section, and the plurality of V-shaped ribs 15 are arranged in parallel to one another in the width direction of the belt. Each of the V-shaped ribs 15 has, for example, a height of 2.0 to 3.0 mm, and a width of 1.0 to 3.6 mm at a proximal end. The belt includes 3-6 ribs (3 ribs in FIG. 1), for example.

The adhesion rubber layer 12 is in the shape of a strip having a horizontally elongated rectangular cross-section, and has a thickness of 1.0 to 2.5 mm, for example.

The backside rubber layer 13, too, is in the shape of a strip having a horizontally elongated rectangular cross-section, and has a thickness of 0.4 to 0.8 mm, for example. The surface of the backside rubber layer 13 preferably has a weave pattern transferred from woven fabric in order to reduce sound generated between the belt back surface and a flat pulley in contact with the belt back surface.

Each of the compression rubber layer 11, the adhesion rubber layer 12, and the backside rubber layer 13 is made of a rubber composition produced by heating and pressing an uncrosslinked rubber composition prepared by kneading a rubber component blended with various ingredients, and crosslinking the kneaded product by the crosslinker. The rubber composition may be obtained by crosslinking with sulfur as the crosslinker, or may be obtained by crosslinking with an organic peroxide as the crosslinker.

The compression rubber layer 11, the adhesion rubber layer 12, and the backside rubber layer 13 may be made of different rubber compositions, or may be made of the same rubber composition. In order to reduce adhesion between the belt back surface and the flat pulley in contact with the belt back surface, the backside rubber layer 13 is preferably made of a rubber composition which is slightly harder than the rubber composition of the adhesion rubber layer 12.

Examples of the rubber component of the rubber composition of each of the compression rubber layer 11, the adhesion rubber layer 12, and the backside rubber layer 13 include an ethylene-α-olefin elastomer (e.g., EPDM, EPR), chloroprene rubber (CR), chlorosulfonated polyethylene rubber (CSM), hydrogenated acrylonitrile-butadiene rubber (H-NBR), etc. Examples of the ingredient include a reinforcer, a filler, an antioxidant, a softener, a crosslinker, a vulcanization accelerator, etc. The V-ribbed belt body 10 may be comprised of the compression rubber layer 11 and the adhesion rubber layer 12. The backside rubber layer 13 may be replaced with reinforcement fabric made, for example, of woven fabric, knitted fabric, or unwoven fabric made of fibers such as cotton, polyamide fibers, polyester fibers, and aramid fibers, etc.

The rubber composition of the compression rubber layer 11 may be blended with short fibers, such as nylon short fibers. In such a case, it is preferable that the short fibers are blended in the compression rubber layer 11 so as to align in the belt width direction, and that the short fibers are blended so as to project from the surface of the compression rubber layer 11. Further, instead of blending the short fibers in the rubber composition of the compression rubber layer 11, the short fibers may be adhered to the surface of the compression rubber layer 11.

The cord 14 is arranged so as to form a helical pattern at a predetermined pitch in the width direction of the belt, and the pitch of the helical pattern is 0.8 to 1.5 mm, for example.

The cord 14 is made of filament yarn of organic fibers. Example organic fibers forming the cord 14 include aliphatic polyamide fiber (PA), polyethlene terephthalate fibers (PET), polyethylene naphthalate fibers (PEN), vinylon fibers (PVA), etc. Among these fibers, aliphatic polyamide fibers (PA) are preferable since the V-ribbed belt B is of stretch type. Example aliphatic polyamide fibers include nylon 66 fibers, nylon 6 fibers, nylon 46 fibers, nylon 610 fibers, nylon 12 fibers, nylon 611 fibers, nylon 612 fibers, etc.

The glass transition temperature of the organic fibers forming the cord 14 is as follows: in the case of aliphatic polyamide fiber (PA), the glass transition temperatures of nylon 66 fibers, nylon 6 fibers, and nylon 46 fibers is 50° C., 50° C., and 60° C., respectively; the glass transition temperature of polyethlene terephtalate fibers (PET) is 67° C.; the glass transition temperature of polyethylene naphthalate fibers (PEN) is 113° C.; and the glass transition temperature of vinylon fibers (PVA) is about 85° C. The glass transition temperatures are measured by differential scanning calorimetry (DSC).

The cord 14 may be made of organic fibers of a single type, or may be made of a mixture of organic fibers of multiple types. The filament yarn of organic fibers which form the cord 14 has a fineness of 2 to 6 dtex, for example, and a filament diameter of 14 to 25 μm, for example.

The total fineness of the organic fiber which forms the cord 14 is preferably 2500 dtex or more in terms of obtaining an appropriate, stable-state tension of the V-ribbed belt B, and more preferably 4000 dtex, and preferably 10000 dtex or less, and more preferably 8000 dtex or less. The outer diameter of the cord 14 is preferably 0.5 to 1.5 mm, and more preferably 0.7 to 1.1 mm. The "stable-state tension" as used in the present application is a belt tension after an initial extension of the belt, that is, a belt tension after a belt extension in the early time until the belt tension is almost stabilized by power transmission.

Example yarn configurations of the cord 14 include single twist yarn, plied yarn, lang's lay, and braid yarn. Among these yarns, single twist yarn and plied yarn are preferable.

In the case where the cord 14 is made of single twist yarn, the number of twist is preferably 3 T/10 cm or more, and more preferably 6 T/10 cm or more, and preferably 20 T/10 cm or less, and more preferably 15 T/10 cm or less, in terms of obtaining appropriate, stable-state tension of the V-ribbed belt B. The cord 14 made of single twist yarn may be S-twist yarn or Z-twist yarn, or S-twist yarn and Z-twist yarn may be used to form a double helix.

In the case where the cord 14 is made of plied yarn, the fineness of the first-twist yarn is preferably 100 dtex or more, and more preferably 400 dtex, and preferably 1500 dtex or less, and more preferably 1000 dtex or less, in terms of obtaining an appropriate, stable-state tension of the V-ribbed belt B. The number of first twists is preferably 6 T/10 cm or more, more preferably 12 T/10 cm or more, and preferably 35 T/10 cm or less, and more preferably 25 T/10 cm or less, in terms of obtaining an appropriate, stable-state tension of the V-ribbed belt B. The number of first-twist yarns is preferably 2 to 7, and more preferably 3 to 5. The number of second twists is preferably 3 T/10 cm or more, and more preferably 6 T/10 cm or more, and preferably 20 T/10 cm or less, and more preferably 15 T/10 cm or less, in terms of obtaining an appropriate, stable-state tension of the V-ribbed belt B. The cord 14 made of plied yarn may be S-twist yarn of which the second twisting is S-twist, or Z-twist yarn of which the second twisting is Z-twist, or S-twist yarn and Z-twist yarn may be used to form a double helix.

Figure 2:
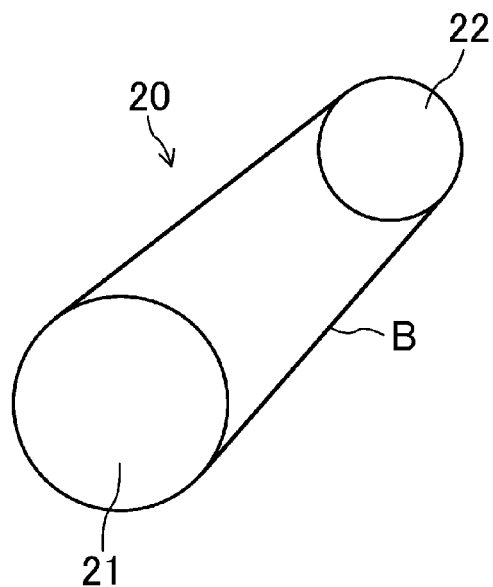
FIG. 2 shows a layout of pulleys of an accessory belt transmission system of an automobile using the V-ribbed belt according to the embodiment.

FIG. 2 shows a layout of pulleys of an accessory belt transmission system 20 of an automobile using the V-ribbed belt B of the present embodiment.

The accessory belt transmission system 20 includes a crank shaft pulley 21 and a water pump pulley 22 positioned at an upper right-hand side of the crank shaft pulley 21. Both of the crank shaft pulley 21 and the water pump pulley 22 are ribbed pulleys, and are made of pressed metals or castings, or resin moldings using nylon resin and phenol resin, for example. The diameter of the crank shaft pulley 21 is 120 to 170 mm, for example, and the diameter of the water pump pulley 22 is 80 to 120 mm, for example. In the accessory belt transmission system 20, the V-ribbed belt B is wrapped around the crank shaft pulley 21 and the water pump pulley 22 such that the V-shaped ribs 15 come in contact with the crank shaft pulley 21 and the water pump pulley 22. The stable-state tension of the V-ribbed belt B wrapped around the crank shaft pulley 21 and the water pump pulley 22 is preferably 80 N or more and more preferably 90 N or more per V-shaped rib 15, and preferably 120 N or less and more preferably 110 N or less per V-shaped rib 15.

The accessory belt transmission system 20 may include three or more pulleys.

(Fabrication Method of V-Ribbed Belt B)

Now, the first and second fabrication methods of the V-ribbed belt B according to the embodiment will be described.

[First Fabrication Method]

The first fabrication method includes a material preparation step, a material positioning step, a vulcanization-molding step, a grinding step, a width cutting step, and a stable-state tension inspection step. The first fabrication method is a method for forming the V-shaped rib 15 of the V-ribbed belt B by grinding in the grinding step.

<Material Preparation Step>

First, compounds are blended in a rubber component, and the rubber component is kneaded by a mixer, such as a kneader and a Banbury mixer. The obtained uncrosslinked rubber composition is shaped into a sheet using a calender, etc., thereby forming an uncrosslinked rubber sheet 11' to be used as the compression rubber layer 11. In the case of forming the compression rubber layer 11 containing short fibers, short fibers may be blended in the uncrosslinked rubber sheet 11'. Uncrosslinked rubber sheets 12' and 13' to be used as the adhesion rubber layer 12 and the backside rubber layer 13 are formed in a similar manner.

Twisted yarn for the cord 14' is subjected to an adhesion treatment in which the twisted yarn is immersed in an RFL aqueous solution and heated.

The RFL aqueous solution is an initial condensate of resorcin and formaldehyde mixed with latex. The temperature of the RFL aqueous solution is 20 to 30° C., for example. The solid content of the RFL aqueous solution is 30% by mass or less, for example. The molar ratio between resorcin (R) and formalin (F) is R/F=1/1 to ½, for example. The latex includes, for example, vinylpyridine-styrene-butadiene rubber latex (Vp·SBR), chloroprene rubber latex (CR), and chlorosulfonated polyethylene rubber latex (CSM), etc. The mass ratio between the initial condensate (RF) of resorcin and formaldehyde and the latex (L) is RF/L=1/5 to 1/20, for example.

Immersion time in which the cord 14' is immersed in the RFL aqueous solution is 1 to 3 seconds, for example. The heating temperature (i.e., a furnace temperature) at which the cord 14' is heated after immersion in the RFL aqueous solution is 200 to 250° C., for example. Heating time (i.e., dwell time in furnace) is 1 to 3 minutes, for example. The tension applied to the cord 14' for heat setting during the adhesion treatment using the RFL aqueous solution is preferably 0.0009 N/dtex or more and more preferably 0.0017 N/dtex or more, and preferably 0.017 N/dtex or less and more preferably 0.0052 N/dtex or less, in terms of obtaining an appropriate, stable-state tension of the V-ribbed belt B. The adhesion treatment of the cord 14' using the RFL aqueous solution may be performed only once or may be performed two or more times. An RFL coating adheres to the cord 14'. The adhesion amount (i.e., coating weight) of the RFL coating is 2 to 5% by mass, for example, with respect to mass of the organic fiber comprising the cord 14'.

The cord 14' may be subjected to an adhesion treatment in which the cord 14' is immersed in a primer solution obtained by dissolving epoxy or isocyanate (blocked isocyanate) in a solvent, such as toluene, or dispersing epoxy or isocyanate (blocked isocyanate) in water, and is heated before the adhesion treatment using the RFL aqueous solution. The temperature of the primer solution is 20 to 30° C., for example. The solid content of the primer solution is 20% by mass or less, for example.

Immersion time in which the cord 14' is immersed in the primer solution is 1 to 3 seconds, for example. The heating temperature (i.e., a furnace temperature) at which the cord 14' is heated after immersion in the primer solution is 200 to 250° C., for example. Heating time (i.e., dwell time in furnace) is 1 to 3 minutes, for example. The tension applied to the cord 14' during the adhesion treatment using the primer solution is preferably 0.0009 N/dtex or more and more preferably 0.0017 N/dtex or more, and preferably 0.017 N/dtex or less and more preferably 0.0052 N/dtex or less, in terms of obtaining an appropriate, stable-state tension of the V-ribbed belt B. The adhesion treatment of the cord 14' using the primer solution may be performed only once or may be performed two or more times. A resin coating adheres to the cord 14'. The adhesion amount (i.e., coating weight) of the resin coating is 2 to 5% by mass, for example, with respect to mass of the organic fiber comprising the cord 14'.

The cord 14' may be subjected to an adhesion treatment in which the cord 14' is immersed in rubber cement obtained by dissolving an unvulcanized rubber composition in a solvent, such as toluene, and is dried after the adhesion treatment using the RFL aqueous solution. The temperature of the rubber cement is 20 to 30° C., for example. The solid content of the rubber cement is 20% by mass or less, for example.

Immersion time in which the cord 14' is immersed in the rubber cement is 1 to 3 seconds, for example. The drying temperature (i.e., a furnace temperature) at which the cord 14' is dried after immersion in the rubber cement is 50 to 100° C., for example. Drying time (i.e., dwell time in furnace) is 1 to 3 minutes, for example. The tension applied to the cord 14' during the adhesion treatment using the rubber cement is preferably 0.0009 N/dtex or more and more preferably 0.0017 N/dtex or more, and preferably 0.017 N/dtex or less and more preferably 0.0052 N/dtex or less, in terms of obtaining an appropriate, stable-state tension of the V-ribbed belt B. The adhesion treatment of the cord 14' using the rubber cement may be performed only once or may be performed two or more times. A rubber cement coating adheres to the cord 14'. The adhesion amount (i.e., coating weight) of the rubber cement coating is 2 to 5% by mass, for example, with respect to mass of the organic fiber comprising the cord 14'.

The contraction stress of the cord 14' in heating and drying the cord 14' after the adhesion treatment is preferably 5 N/dtex or more and more preferably 10 N/dtex or more, and preferably 30 N/dtex or less and more preferably 25 N/dtex or less, in terms of obtaining an appropriate, stable-state tension of the V-ribbed belt B. The intermediate elasticity of the cord 14' after the adhesion treatment is preferably 1% or more and more preferably 3% or more, and preferably 8% or less and more preferably 6% or less, in terms of obtaining an appropriate, stable-state tension of the V-ribbed belt B. The contraction stress in heating and drying and the intermediate elasticity are values measured based on JIS L1017.

<Material Positioning Step>

Figure 3:
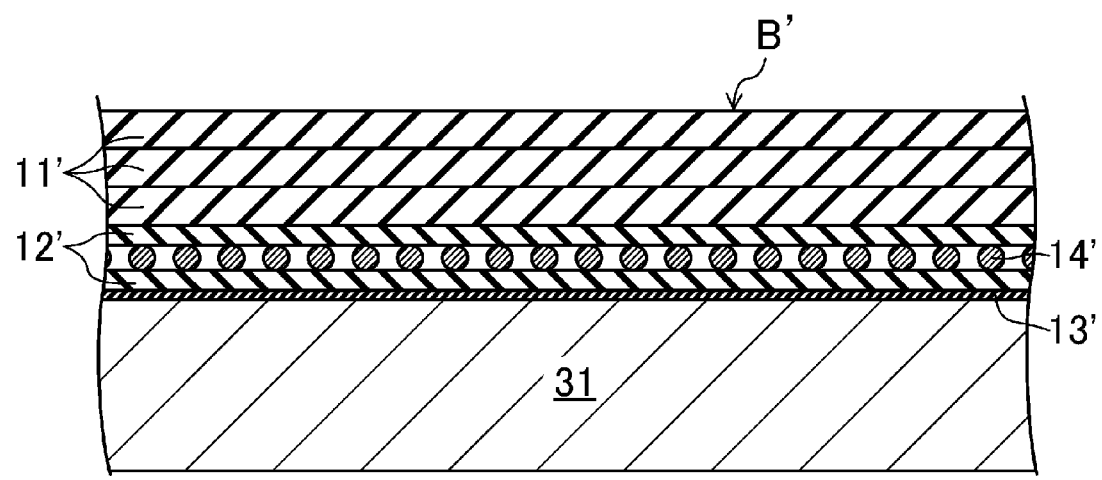
FIG. 3 is the first drawing for explaining a first fabrication method of the V-ribbed belt according to the embodiment.

Next, as shown in FIG. 3, the uncrosslinked rubber sheet 13' for the backside rubber layer 13 and the uncrosslinked rubber sheet 12' for the adhesion rubber layer 12 are sequentially wrapped around the cylindrical mold 31 to be layered on the outer circumference of the cylindrical mold 31. The cord 14' is wrapped around the resultant layers on the cylindrical mold 31 in a helical manner, with a predetermined tension applied to the cord 14'. Further, the uncrosslinked rubber sheet 12' for the adhesion rubber layer 12 and the uncrosslinked rubber sheet 11' for the compression rubber layer 11 are sequentially wrapped around and layered on the cylindrical mold 31, thereby forming a belt formation body B'.

A predetermined tension is applied to the cord 14' when the cord 14' is wrapped around. The tension is preferably 0.0009 N/dtex or more and more preferably 0.0017 N/dtex or more, and preferably 0.0052 N/dtex or less and more preferably 0.0035 N/dtex or less, in terms of obtaining an appropriate, stable-state tension of the V-ribbed belt B.

<Vulcanization-Molding Step>

Figure 4:
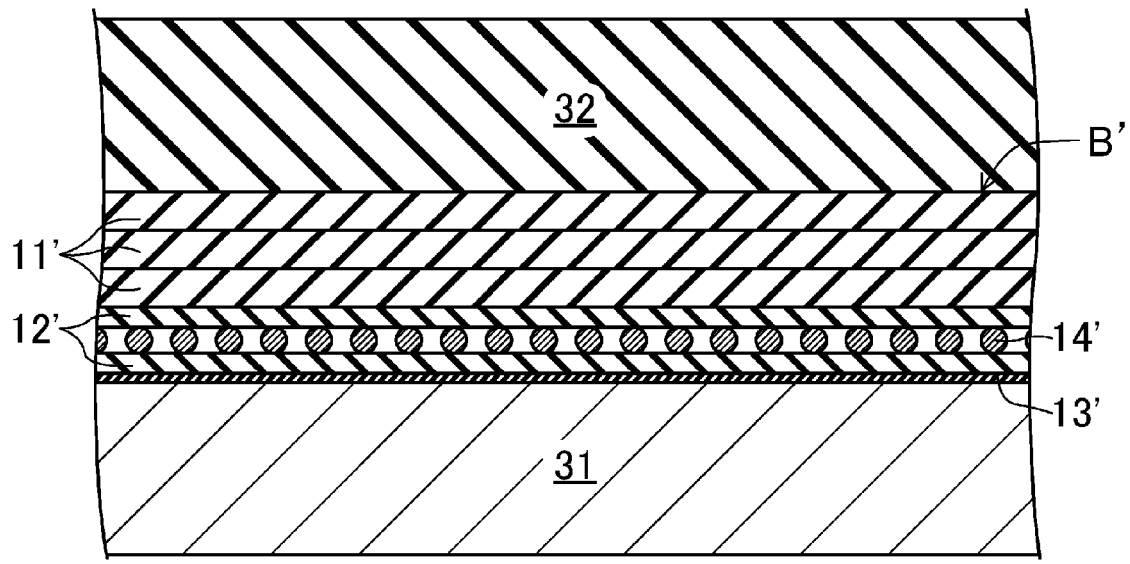
FIG. 4 is the second drawing for explaining the first fabrication method of the V-ribbed belt according to the embodiment.
Figure 5:
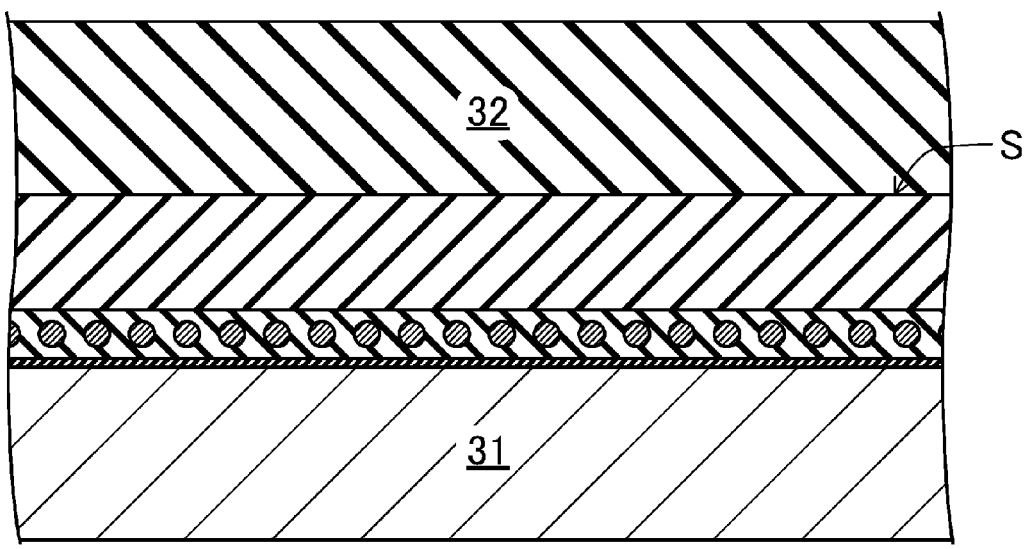
FIG. 5 is the third drawing for explaining the first fabrication method of the V-ribbed belt according to the embodiment.

Next, as shown in FIG. 4, a rubber sleeve 32 is placed on the belt formation body B'. The belt formation body B' with the rubber sleeve 32 is placed in a vulcanizer, and the vulcanizer is sealed. The vulcanizer is filled with high-temperature and high-pressure steam, and the belt formation body B' with the rubber sleeve 32 is held in the vulcanizer for a predetermined molding time. At this moment, as shown in FIG. 5, cross-linking is promoted between the uncrosslinked rubber sheets 11', 12' and 13', and the rubber sheets 11', 12' and 13' are integrated and combined with the cord 14'. As a result, a cylindrical belt slab S is molded.

The molding temperature of the belt slab S is 100 to 180° C., for example. The molding pressure is 0.5 to 2.0 MPa, for example. The molding time is 10 to 60 minutes, for example.

<Grinding Step>

Figure 6:
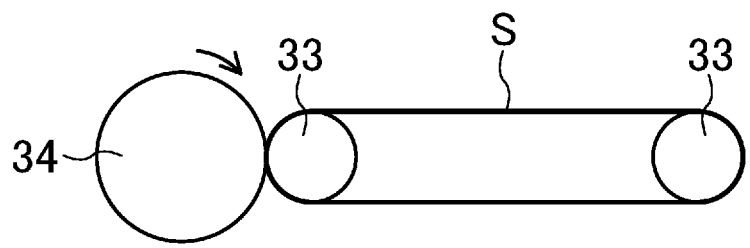
FIG. 6 is the fourth drawing for explaining the first fabrication method of the V-ribbed belt according to the embodiment.
Figure 7:
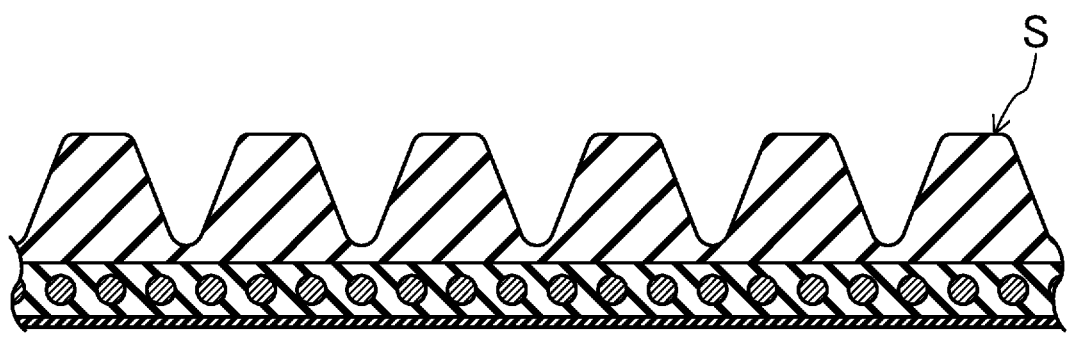
FIG. 7 is the fifth drawing for explaining the first fabrication method of the V-ribbed belt according to the embodiment.

Next, the steam is released from the vulcanizer to remove the sealing of the vulcanizer. The belt slab S molded on the cylindrical mold 31 is removed from the mold, and is looped over a pair of slab holding axes 33 as shown in FIG. 6. A grinding stone 34, which has V-shaped rib formation grooves extending in a circumferential direction of the grinding stone 34 and sequentially arranged along an axial direction of the grinding stone 34, is rotated and brought into contact with the outer circumference surface of the belt slab S, and the belt slab S is also rotated on the pair of slab holding axes 33, thereby grinding the belt slab S all around the outer circumference surface thereof. As a result, V-shaped ribs 15 are formed in the outer circumference surface of the belt slab S, as shown in FIG. 7. If necessary, the belt slab S may be cut into parts in its lengthwise direction for grinding.

<Width Cutting Step>

The belt slab S in which the V-shaped ribs 15 are formed by grinding is cut into pieces having a predetermined width, and turned inside out, thereby obtaining the V-ribbed belt B.

<Stable-State Tension Inspection Step>

Lastly, a stable-state tension of the V-ribbed belt B obtained in the width cutting step is inspected.

Figure 8:
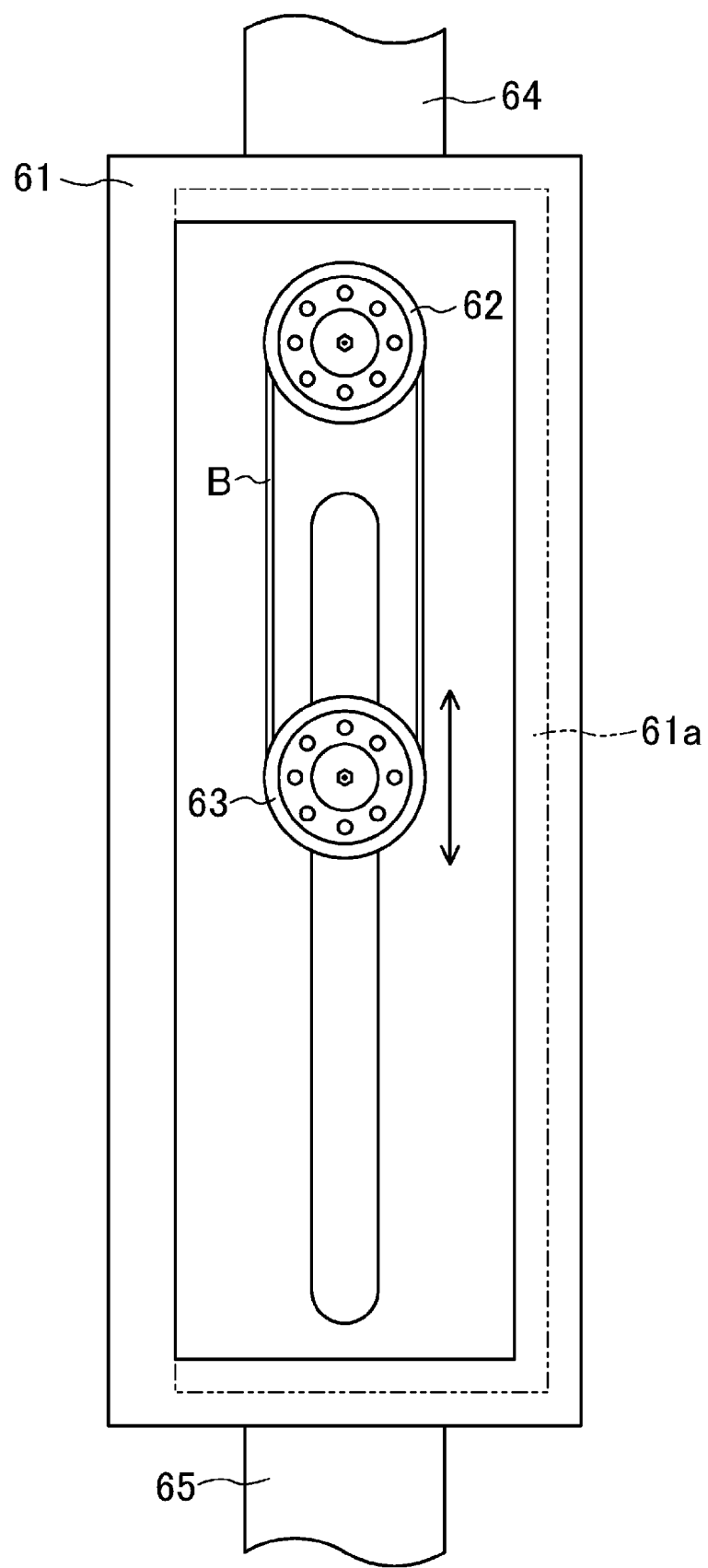
FIG. 8 is a front view of a stable-state tension measuring device used in a stable-state tension inspection step in the first fabrication method of the V-ribbed belt according to the embodiment.

FIG. 8 shows a stable-state tension measuring device 60 used to measure a stable-state tension of the V-ribbed belt B.

The stable-state tension measuring device 60 includes a vertical longitudinal heating bath 61, and a drive pulley 62 and a driven pulley 63 which are provided at upper and lower portions in the heating bath 61 and around which the V-ribbed belt B is wrapped around.

The heating bath 61 is provided with a door 61a in its front surface. The door 61a is opened to attach and detach the V-ribbed belt B for inspection, to and from the drive pulley 62 and the driven pulley 63. The door 61a is closed to measure the stable-state tension of the V-ribbed belt B.

A feed pipe 64 is connected to an upper portion of the heating bath 61, and an exhaust pipe 65 is connected to an lower portion of the heating bath 61. The feed pipe 64 and the exhaust pipe 65 are connected to a temperature-controlled air circulation pump. The feed pipe 64, the exhaust pipe 65, and the temperature-controlled air circulation pump form a temperature-control mechanism that is provided at the heating bath 61 and is configured to circulate temperature-controlled air and successively supply/discharge the temperature-controlled air into/from the heating bath 61. Further, a heater may be provided inside or outside the heating bath 61 to form the temperature-control mechanism.

The drive pulley 62 is fixed at an upper portion of the heating bath 61 so that it is rotatable about an axis, and is connected to a drive source (not shown). The drive pulley 62 is a ribbed pulley. The diameter of the drive pulley 62 is preferably 45 mm or more and more preferably 70 mm or more, and preferably 150 mm or less and more preferably 120 mm or less.

The driven pulley 63 is provided at a lower portion of the drive pulley 62 so that it is rotatable about an axis and movable up and down. The driven pulley 63 is configured to keep a predetermined center distance between the drive pulley 62 and the driven pulley 63. Further, the driven pulley 63 is provided with a load cell (not shown) for detecting an axial load. A belt tension of the V-ribbed belt B can be calculated from the axial load detected by the load cell, and thus, the load cell forms a belt tension detection mean which detects a belt tension of the V-ribbed belt B. The driven pulley 63 is also a ribbed pulley. The diameter of the driven pulley 63 is preferably 45 mm or more and more preferably 70 mm or more, and preferably 150 mm or less and more preferably 120 mm or less. The diameter of the driven pulley 63 is preferably the same as the diameter of the drive pulley 62. In that case, one half of the axial load detected by the load cell is a belt tension.

The number of pulleys of the stable-state tension measuring device 60 is not limited to two, i.e., the drive pulley 62 and the driven pulley 63, but may be three or more. In that case, the three or more pulleys may include, other than a ribbed pulley, a flat pulley which comes in contact with the back side of the V-ribbed belt B and presses the V-ribbed belt B.

In the inspection of the stable-state tension using the stable-state tension measuring device 60, the door 61a of the heating bath 61 is opened first, and the V-ribbed belt B is wrapped around the drive pulley 62 and the driven pulley 63. The driven pulley 63 is moved downward and is stopped when the drive pulley 62 and the driven pulley 63 have a predetermined center distance. The V-ribbed belt B is extended at this time, and a belt tension is applied to the V-ribbed belt B. The center distance between the drive pulley 62 and the driven pulley 63 is set such that the length of the V-ribbed belt wrapped around the drive pulley 62 and the driven pulley 63 is the same as the length of the V-ribbed belt B wrapped around the pulleys arranged in the layout actually used. The belt tension applied to the V-ribbed belt B in the initial time of wrapping is preferably 20 N or more per V-shaped rib, and more preferably 50 N or more per V-shaped rib, and preferably 200 N or less per V-shaped rib, and more preferably 120 N or less per V-shaped rib.

Next, the door 61a of the heating bath 61 is closed, and warm air is supplied to the heating bath 61 through the feed pipe 64 so that the inside of the heating bath 61 is in a high-temperature atmosphere, thereby increasing the temperature of the V-ribbed belt B to a temperature higher than a glass transition temperature of the organic fiber forming the cord 14. The temperature of the V-ribbed belt B is preferably higher than the glass transition temperature of the organic fiber forming the cord 14 by 10 to 50° C., more preferably by 20 to 40° C. The temperature of the V-ribbed belt B can be measured by a non-contact type thermometer, etc. To increase the temperature of the V-ribbed belt B to a predetermined belt temperature, it is preferable that the ambient temperature in the heating bath 61 is higher than the predetermined belt temperature by 20° C. or so.

After that, the belt tension of the V-ribbed belt B wrapped around the drive pulley 62 and the driven pulley 63 is measured as a stable-state tension, based on an axial load detected by the load cell.

The stable-state tension may be measured when the temperature of the V-ribbed belt B becomes higher than the glass transition temperature of the organic fiber forming the cord 14, by stopping the V-ribbed belt B from running and keeping it still while wrapped around the drive pulley 62 and driven pulley 63.

The stable-state tension may be measured while or after the V-ribbed belt B is kept running for a predetermined period of time after the temperature of the V-ribbed belt B becomes higher than the glass transition temperature of the organic fiber forming the cord 14, by rotating the drive pulley 62 with a drive source, with the belt B wrapped around the drive pulley 62 and the driven pulley 63.

In this case, the number of revolutions of the drive pulley 62 is preferably 500 rpm or more, and more preferably 2000 rpm or more, and preferably 6000 rpm or less, and more preferably 4000 rpm or less.

Running time of the V-ribbed belt B is preferably 0.5 minute or more and more preferably 1 minute or more, and preferably 5 minutes or less and more preferably 3 minutes or less.

The stable-state tension may be measured right after running of the V-ribbed belt B, may be measured after a predetermined period of time (e.g., 0.5 to 3 minutes) has passed after running of the V-ribbed belt B, or may be measured after the V-ribbed belt B is cooled after running. In the case where the V-ribbed belt B is cooled, cool air is supplied into the heating bath 61 through the feed pipe 64 so that the inside of the heating bath 61 may be in a low-temperature atmosphere. The temperature of the V-ribbed belt B after cooling is preferably 10° C. or more and more preferably 20° C. or more, and preferably 40° C. or less and more preferably 30° C. or less.

It is an advantage of stretch type V-ribbed belts using a cord made of aliphatic polyamide fibers that no tension applying mechanism, such as an auto tensioner, is necessary. However, the stretch type V-ribbed belts need to have a configuration that makes its stable-state tension fall within a predetermined tension range, and it is also necessary to inspect whether or not the stable-state tension of the obtained V-ribbed belt falls within the predetermined tension range.

Figure 9:
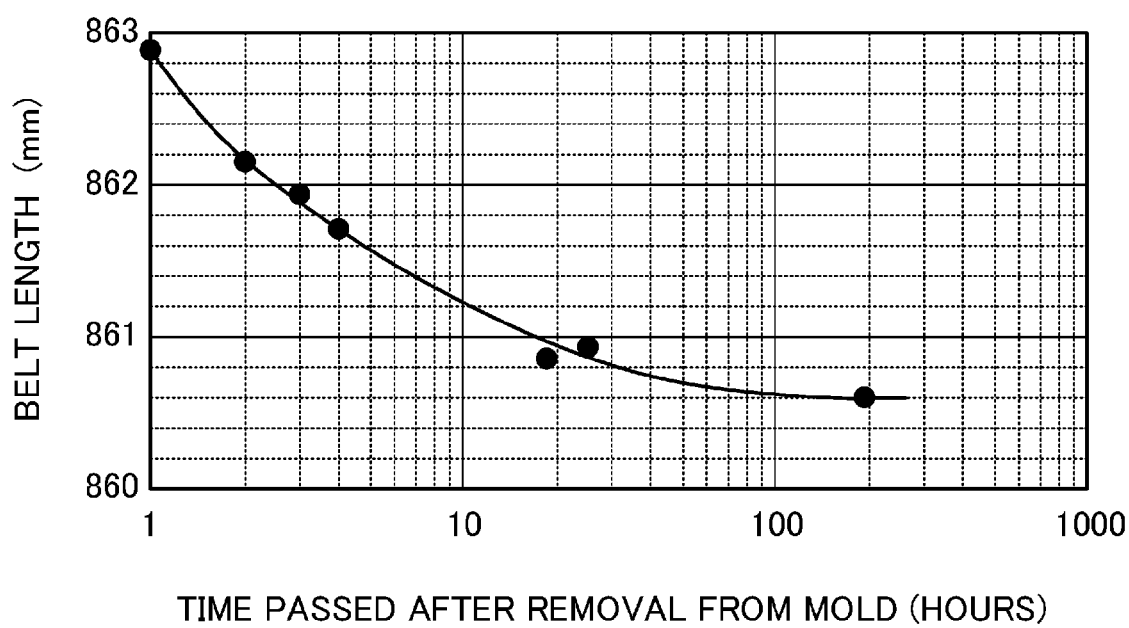
FIG. 9 is a graph showing a relationship between time having passed after removal of the V-ribbed belt from a mold and the belt length.

Actually running the V-ribbed belt B in a continuous manner in order to inspect a stable-state tension may be one of methods for inspecting the stable-state tension. However, running the V-ribbed belt B until it exhibits its stable-state tension in a room temperature atmosphere takes a long time, and therefore, it takes too much time to inspect the stable-state tension. Further, since the stable-state tension largely depends on the belt length, measuring the belt length as an alternative characteristic may be another one of methods for inspecting the stable-state tension. However, as shown in FIG. 9, the belt length significantly varies as time passes by after the belt slab S is removed from the mold, and it is practically impossible to fix the length of time from removal of the belt slab S from the mold until the inspection of the stable-state tension. Therefore, the stable-state tension cannot be inspected with high accuracy by measuring the belt length. Here, FIG. 9 shows variation with time in the length of the V-ribbed belt B formed using a cylindrical mold having a circumferential length of 862 mm, after removal of the belt slab S from the mold.

However, according to the method described above, the stable-state tension can be easily inspected with high accuracy by increasing the temperature of the V-ribbed belt B wrapped around the drive pulley 62 and the driven pulley 63 to a temperature higher than the glass transition temperature of the organic fiber forming the cord 14. This may be because a reduction in the belt tension due to initial creep of the V-ribbed belt B is accelerated and the reduction in belt tension is removed in a short time, and therefore, the belt tension is stabilized.

There is a correlation between a tension in helically winding the cord 14' around the cylindrical mold 31 and a stable-state tension of the V-ribbed belt B. It is therefore preferable to change the tension to be applied to the cord 14' in the material positioning step, based on the stable-state tension measured in the stable-state tension inspection step, in order to reduce variations in the stable-state tension of the V-ribbed belt B. Specifically, if the stable-state tension measured is close to an upper limit of the specification or exceeds the upper limit, it is preferable that this information is fed back, and that a tension to be applied to the cord 14' in helically winding the cord 14' around the cylindrical mold 31 is reduced. On the other hand, if the stable-state tension measured is close to a lower limit of the specification or less than the lower limit, it is preferable that this information is fed back, and that a tension to be applied to the cord 14' in helically winding the cord 14' around the cylindrical mold 31 is increased.

Further, the belt length can be controlled by increasing or reducing the amount of grinding in the grinding step. If the stable-state tension measured is close to the upper limit of the specification or exceeds the upper limit, this information is fed back, and the amount of grinding in the grinding step is increased thereby increasing the belt length. On the other hand, if the stable-state tension measured is close to the lower limit of the specification or less than the lower limit, this information is fed back, and the amount of grinding in the grinding step is reduced thereby reducing the belt length. As a result, it is possible to reduce variations in the stable-state tension of the V-ribbed belt B.

[Second Fabrication Method]

The second fabrication method includes a material preparation step, a material positioning step, a vulcanization-molding step, a width cutting step, and a stable-state tension inspection step. The second fabrication method is a method for forming the V-shaped rib 15 of the V-ribbed belt B by molding in the vulcanization-molding step. The material preparation step, and the width cutting step and its succeeding step are the same as those steps in the first fabrication method, and therefore, explanations thereof are omitted. Only the material positioning step and the vulcanization-molding step will be explained below.

<Material Positioning Step>

Figure 10:
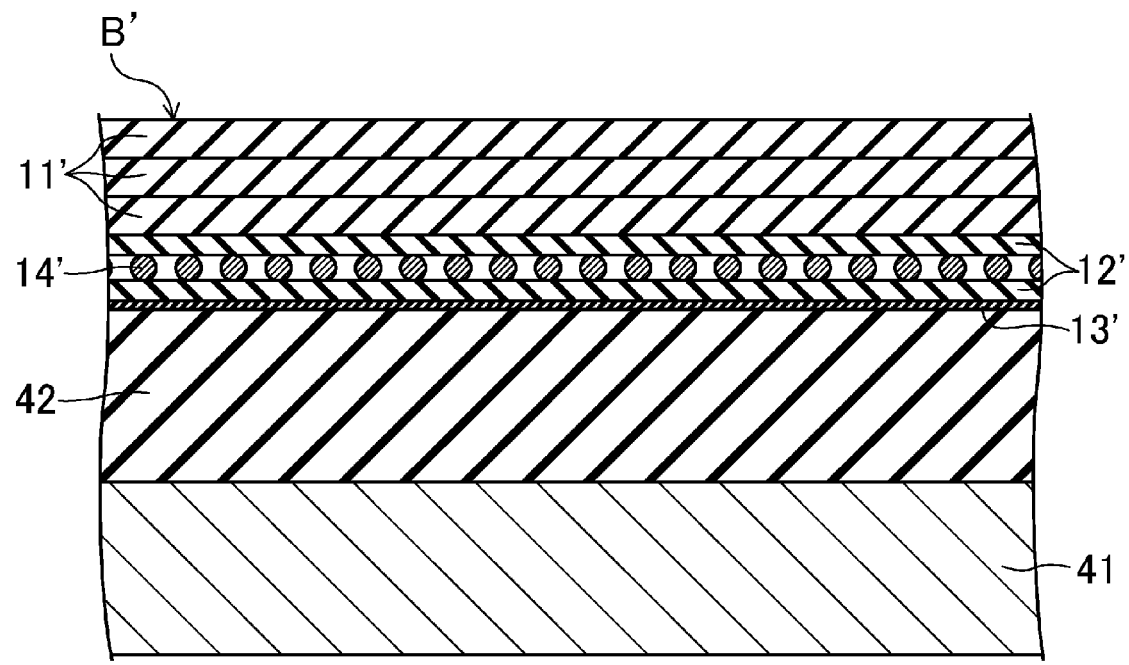
FIG. 10 is the first drawing for explaining the second fabrication method of the V-ribbed belt according to the embodiment.

In the material positioning step, as shown in FIG. 10, a rubber sleeve 42 is placed on a cylindrical drum 41 having a smooth surface. An uncrosslinked rubber sheet 13' for the backside rubber layer 13 and an uncrosslinked rubber sheet 12' for the adhesion rubber layer 12, which are prepared in the material preparation step, are sequentially wrapped around the rubber sleeve 42 to be layered. The cord 14' is wrapped around the resultant layers in a helical manner with respect to a cylindrical inner mold 51. Another uncrosslinked rubber sheet 12' for the adhesion rubber layer 12 and an uncrosslinked rubber sheet 11' for the compression rubber layer 11 are sequentially wrapped to be layered thereon, thereby forming a belt formation body B'. In the case of adhering short fibers on the surface of the compression rubber layer 11, short fibers may be adhered to the surface of the outermost layer of the belt formation body B', that is, the uncrosslinked rubber sheet 11'.

A predetermined tension is applied to the cord 14' when the cord 14' is wrapped around. The tension is preferably 0.0009 N/dtex or more and more preferably 0.0017 N/dtex or more, and preferably 0.0052 N/dtex or less and more preferably 0.0035 N/dtex or less, in terms of obtaining an appropriate, stable-state tension of the V-ribbed belt B.

<Vulcanization-Molding Step>

Figure 11:
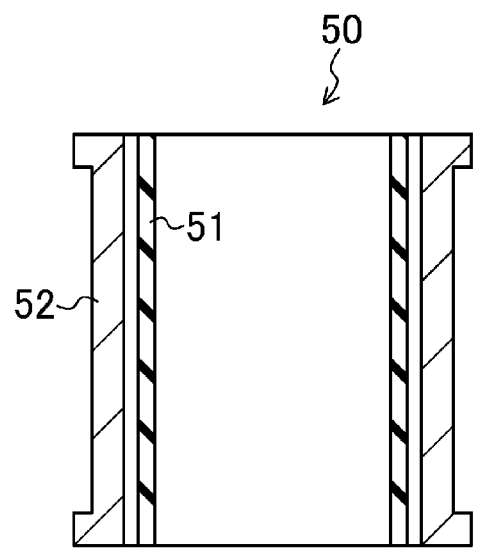
FIG. 11 is a vertical cross-section of a belt forming mold used in a vulcanization-molding step of the second fabrication method of the V-ribbed belt according to the embodiment.
Figure 12:
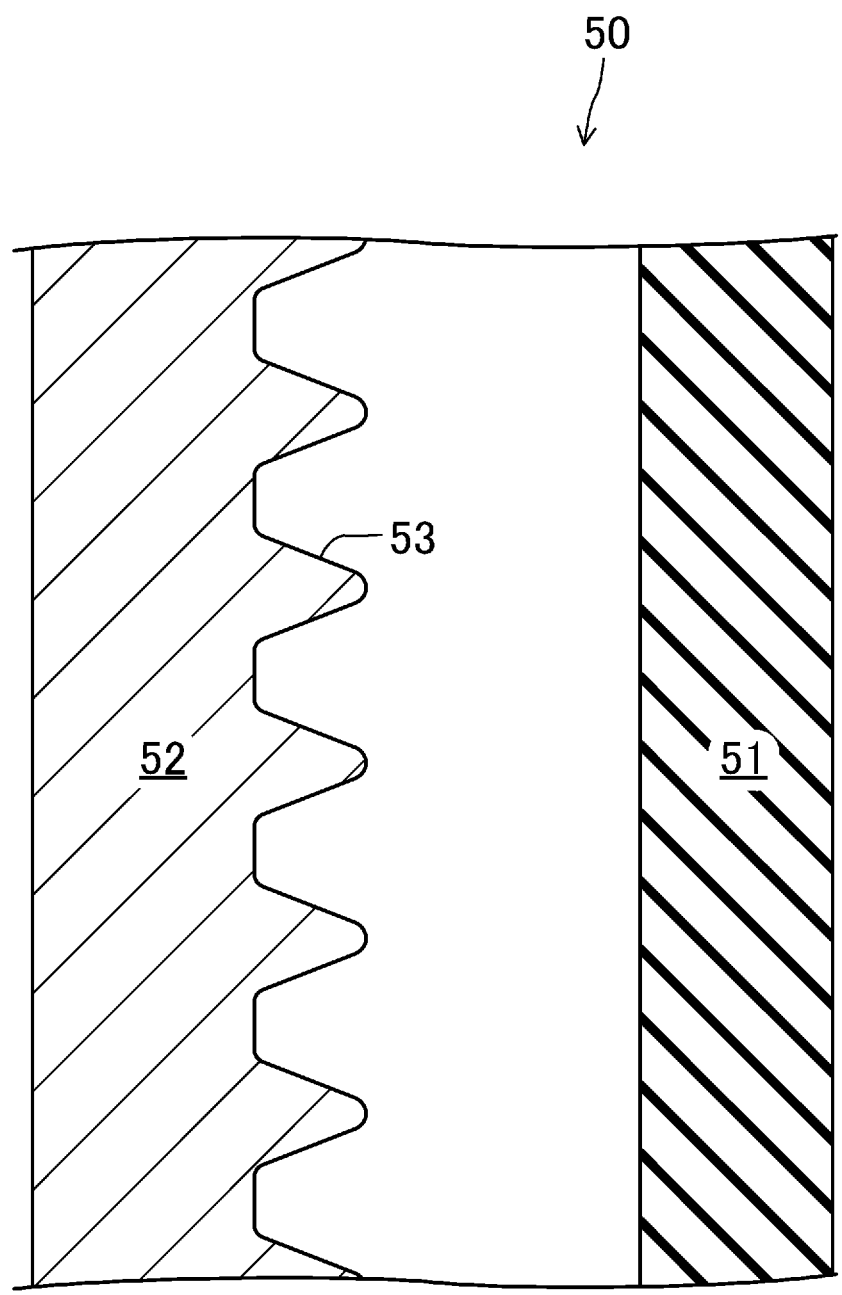
FIG. 12 is a partial vertical cross-section of the belt forming mold used in the vulcanization-molding step of the second fabrication method of the V-ribbed belt according to the embodiment.

FIG. 11 and FIG. 12 show a belt forming mold 50 used in the vulcanization-molding step of the second fabrication method.

The belt forming mold 50 includes a cylindrical, flexible inner mold 51 and an outer mold 52, which are concentric with each other. The inner mold 51 is made of a flexible material such as rubber. The outer circumference surface of the inner mold 51 serves as a molding surface, and a weave pattern of woven fabric, etc., is formed in the outer circumference surface of the inner mold 51. The outer mold 52 is made of a rigid material such as a metal. The inner circumferential surface of the outer mold 52 serves as a molding surface. The inner circumferential surface of the outer mold 52 serves as a V-shaped rib formation surface 53. The outer mold 52 is provided with a temperature-control mechanism which allows a heating medium such as water vapor or a cooling medium such as water to flow and control temperature. The belt forming mold 50 is provided with a pressurizing means configured to pressurize and expand the inner mold 51 from inside.

Figure 13:
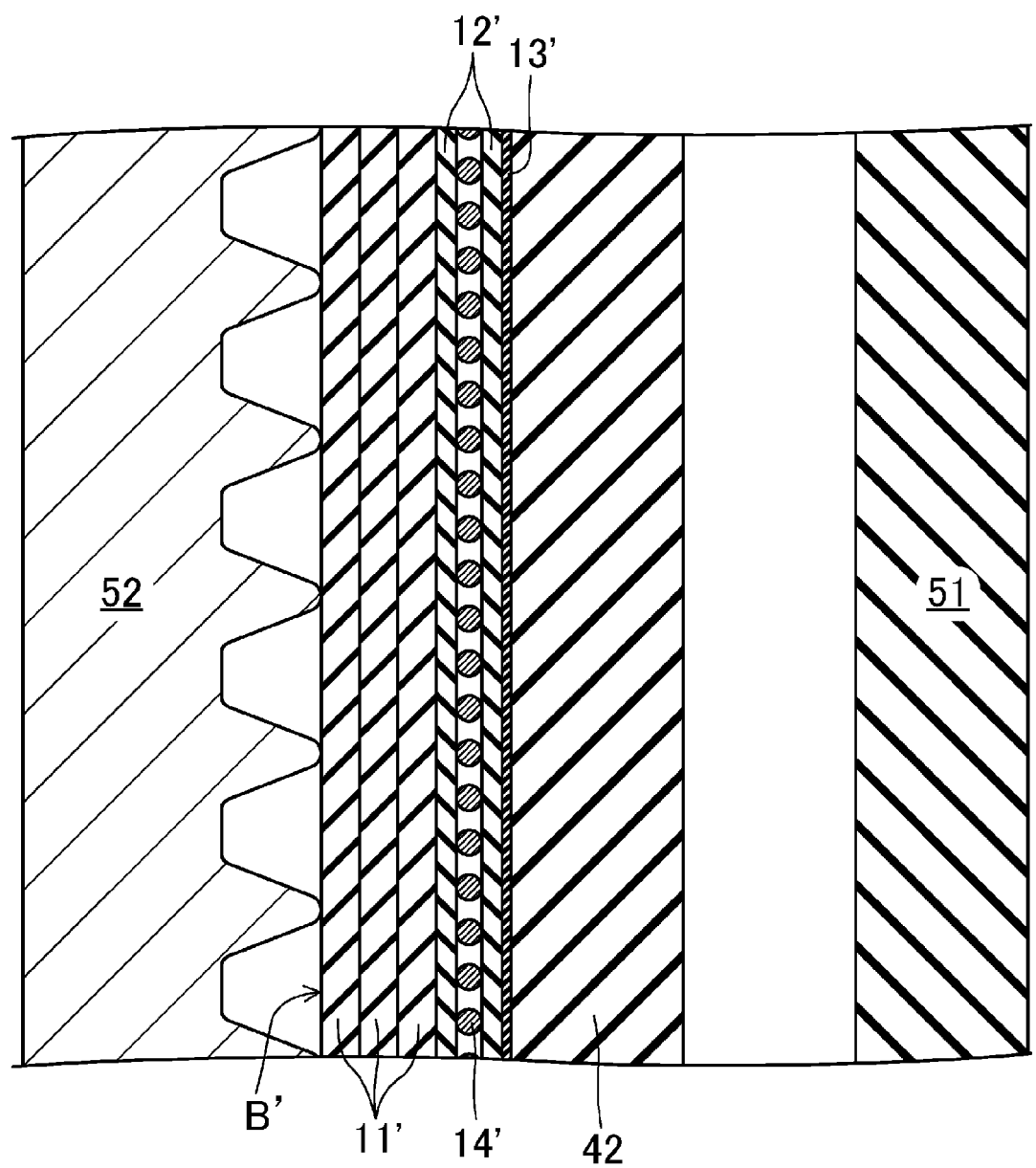
FIG. 13 is the second drawing for explaining the second fabrication method of the V-ribbed belt according to the embodiment.

After the material positioning step, as shown in FIG. 13, the rubber sleeve 42 on which the belt formation body B' is formed is removed from the cylindrical drum 41. The rubber sleeve 42 is positioned inside the outer mold 52 of the belt forming mold 50, and the inner mold 51 is positioned inside the rubber sleeve 42 set on the outer mold 52, thereby providing sealing.

Figure 14:
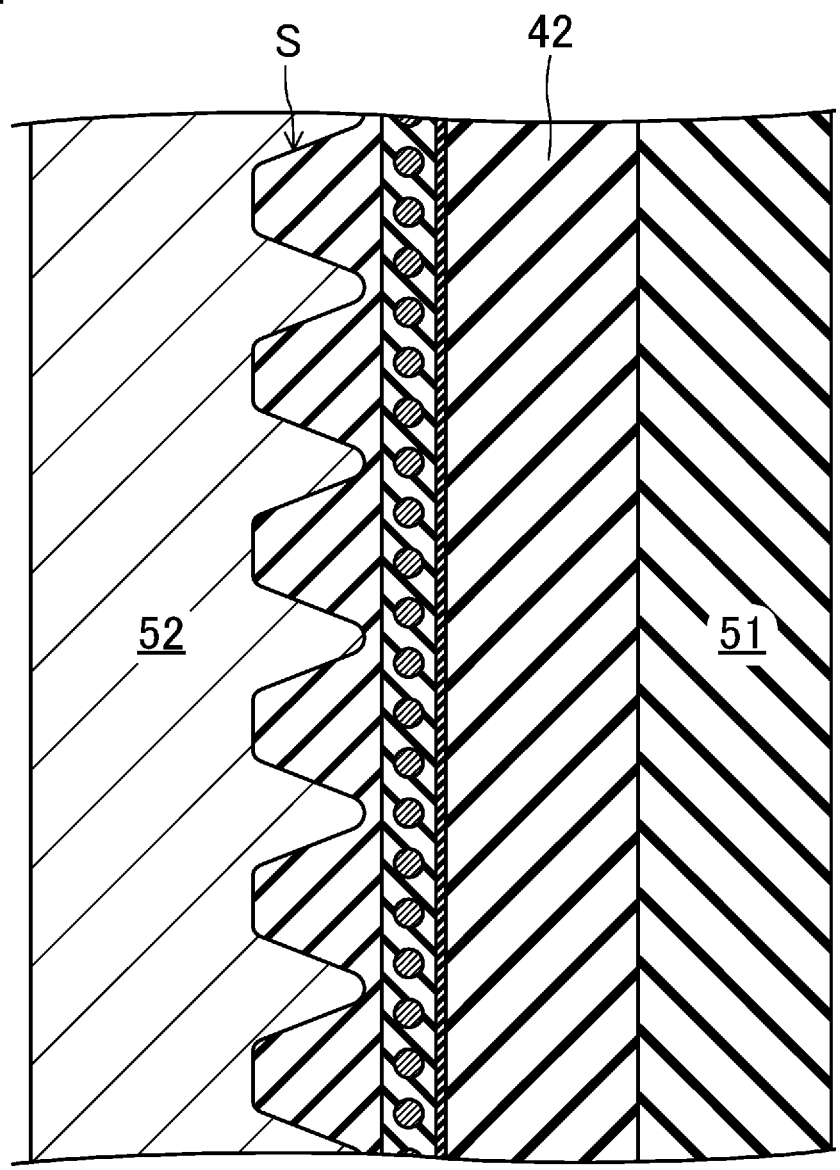
FIG. 14 is the third drawing for explaining the second fabrication method of the V-ribbed belt according to the embodiment.

Subsequently, the outer mold 52 is heated to a predetermined molding temperature, and the inner mold 51 is pressurized by introducing, for example, high-pressure air into its hermetically-sealed inner space. This state is maintained for a predetermined molding time. In this step, as shown in FIG. 14, the inner mold 51 expands, and the belt formation body B' is compressed onto the molding surface of the outer mold 52. At the same time, cross-linking between the uncrosslinked rubber sheets 11', 12' and 13' is promoted, and the sheets are integrated and combined with the cord 14'. As a result, a cylindrical belt slab S having V-shaped ribs 15 in the outer circumference is molded.

The molding temperature of the belt slab S is, for example, 100 to 180° C. The molding pressure is, for example, 0.5 to 2.0 MPa. The molding time is, for example, 10 to 60 minutes.

EXAMPLES

First Evaluation Test

<V-Ribbed Belt>

A V-ribbed belt was formed by the same method as the first fabrication method of the above embodiment. The obtained V-ribbed belt has a length of 856 mm, a thickness of 4.3 mm, and a width of 10 mm with three ribs. In the obtained V-ribbed belt, a cord made of nylon 66 fibers (Leona, plied yarn of 940 dtex/2×3 produced by Asahi Kasei Corp., having a glass transition temperature of 50° C.) was used, and a tension in helically winding the cord around the cylindrical mold was set to 14.7 N per cord (0.0026 N/dtex).

<Evaluation Test Content>

Evaluation tests of the first to third examples and the first to third comparative examples were performed. Results are also shown in Table 1.

First Example

The above V-ribbed belt was wrapped around a pair of pulleys each having a diameter of 100 mm, and the center distance (hereinafter referred to as a "length before inspection") was measured to be 278.43 mm, with substantially no tension applied to the belt. The ride-out dimension (hereinafter referred to as "R/O"), which is a dimension from a pulley's outer circumference (i.e., zero point) to the back surface of the V-ribbed belt wrapped around the pulley, was 2.63 mm.

Next, a stable-state tension measuring device having the same configuration as the stable-state tension measuring device shown in FIG. 8 was used. The V-ribbed belt was wrapped around the drive pulley and the driven pulley of the stable-state tension measuring device, and the driven pulley was moved downward so that the center distance between the pulleys would be 280 mm. The belt tension when the center distance was 280 mm (hereinafter referred to as "belt tension when attached") was 393 N per three V-shaped ribs.

Next, the interior of the heating bath was set to be in an atmospheric temperature of 80° C., and the drive pulley was rotated at 3700 rpm to run the V-ribbed belt for one minute. The belt temperature after running (hereinafter referred to as "belt temperature after running") was 60° C. that is higher than a glass transition temperature of the nylon 66 fibers. The belt temperature was measured using a non-contact type thermometer (THI-700 produced by TASCO JAPAN CO., LTD.). The tension of the running belt (hereinafter referred to as a "running-state belt tension") was 220 N per three V-shaped ribs. The belt tension right after running of the belt (hereinafter referred to as a "warm-state belt tension") was 257 N per three V-shaped ribs.

Subsequently, outside air was introduced in the heating bath to cool the V-ribbed belt. The temperature of the cooled belt (hereinafter referred to as a "belt temperature after cooling") was 18° C. The belt tension after cooling (hereinafter referred to as a "cold-state belt tension") was 220 N per three V-shaped ribs.

Second Example

The same procedures as in the first example were taken, except that the interior of the heating bath was set to be in an atmospheric temperature of 100° C.

The length before inspection was 278.58 mm. The R/O was 2.64 mm. The belt tension when attached was 359 N per three V-shaped ribs. The belt temperature after running was 69° C. that is higher than the glass transition temperature of the nylon 66 fibers. The running-state belt tension was 216 N per three V-shaped ribs. The warm-state belt tension was 245 N per three V-shaped ribs. The belt temperature after cooling was 20° C. The cold-state belt tension was 209 N per three V-shaped ribs.

Third Example

The same procedures as in the first example were taken, except that the interior of the heating bath was set to be in an atmospheric temperature of 120° C.

The length before inspection was 278.36 mm. The R/O was 2.65 mm. The belt tension when attached was 365 N per three V-shaped ribs. The belt temperature after running was 80° C. that is higher than the glass transition temperature of the nylon 66 fibers. The running-state belt tension was 232 N per three V-shaped ribs. The warm-state belt tension was 263 N per three V-shaped ribs. The belt temperature after cooling was 20° C. The cold-state belt tension was 210 N per three V-shaped ribs.

First Comparative Example

The same procedures as in the first example were taken, except that the interior of the heating bath was filled with atmospheric air, and that the V-ribbed belt was not cooled.

The length before inspection was 278.44 mm. The R/O was 2.63 mm. The belt tension when attached was 421 N per three V-shaped ribs. The belt temperature after running was 21° C. that is lower than the glass transition temperature of the nylon 66 fibers. The running-state belt tension was 298 N per three V-shaped ribs. The warm-state belt tension was 340 N per three V-shaped ribs. The belt temperature after cooling was 20° C. The cold-state belt tension was 302 N per three V-shaped ribs.

Second Comparative Example

The same procedures as in the first example were taken, except that the interior of the heating bath was set to be in an atmospheric temperature of 40° C.

The length before inspection was 278.61 mm. The R/O was 2.59 mm. The belt tension when attached was 404 N per three V-shaped ribs. The belt temperature after running was 40° C. that is lower than the glass transition temperature of the nylon 66 fibers. The running-state belt tension was 235 N per three V-shaped ribs. The warm-state belt tension was 276 N per three V-shaped ribs. The belt temperature after cooling was 20° C. The cold-state belt tension was 250 N per three V-shaped ribs.

Third Comparative Example

The same procedures as in the first example were taken, except that the interior of the heating bath was set to be in an atmospheric temperature of 60° C.

The length before inspection was 278.53 mm. The R/O was 2.61 mm. The belt tension when attached was 388 N per three V-shaped ribs. The belt temperature after running was 50° C. that is lower than the glass transition temperature of the nylon 66 fibers. The running-state belt tension was 225 N per three V-shaped ribs. The warm-state belt tension was 262 N per three V-shaped ribs. The belt temperature after cooling was 19° C. The cold-state belt tension was 232 N per three V-shaped ribs.

TABLE 1

|  | EXAMPLE | | | COMPARATIVE EXAMPLE | | |
| --- | --- | --- | --- | --- | --- | --- |
|  | 1 | 2 | 3 | 1 | 2 | 3 |
| LENGTH BEFORE INSPECTION (mm) | 278.43 | 278.58 | 278.36 | 278.44 | 278.61 | 278.53 |
| R/O (mm) | 2.63 | 2.64 | 2.65 | 2.63 | 2.59 | 2.61 |
| BELT TENSION WHEN ATTACHED (N per 3 V-shaped Ribs) | 393 | 359 | 365 | 421 | 404 | 388 |
| BELT TEMPERATURE AFTER RUNNING (° C.) | 60 | 69 | 80 | 21 | 40 | 50 |
| RUNNING-STATE BELT TENSION (N per 3 V-shaped Ribs) | 220 | 216 | 232 | 298 | 235 | 225 |
| WARM-STATE BELT TENSION (N per 3 V-shaped Ribs) | 257 | 245 | 263 | 340 | 276 | 262 |

TABLE 1-continued

| | EXAMPLE | | | COMPARATIVE EXAMPLE | | |
|---|---|---|---|---|---|---|
| | 1 | 2 | 3 | 1 | 2 | 3 |
| BELT TEMPERATURE AFTER COOLING (° C.) | 18 | 20 | 20 | 20 | 20 | 19 |
| COLD-STATE BELT TENSION (N per 3 V-shaped Ribs) | 220 | 209 | 210 | 302 | 250 | 232 |

<Evaluation Test Results>

Figure 15:
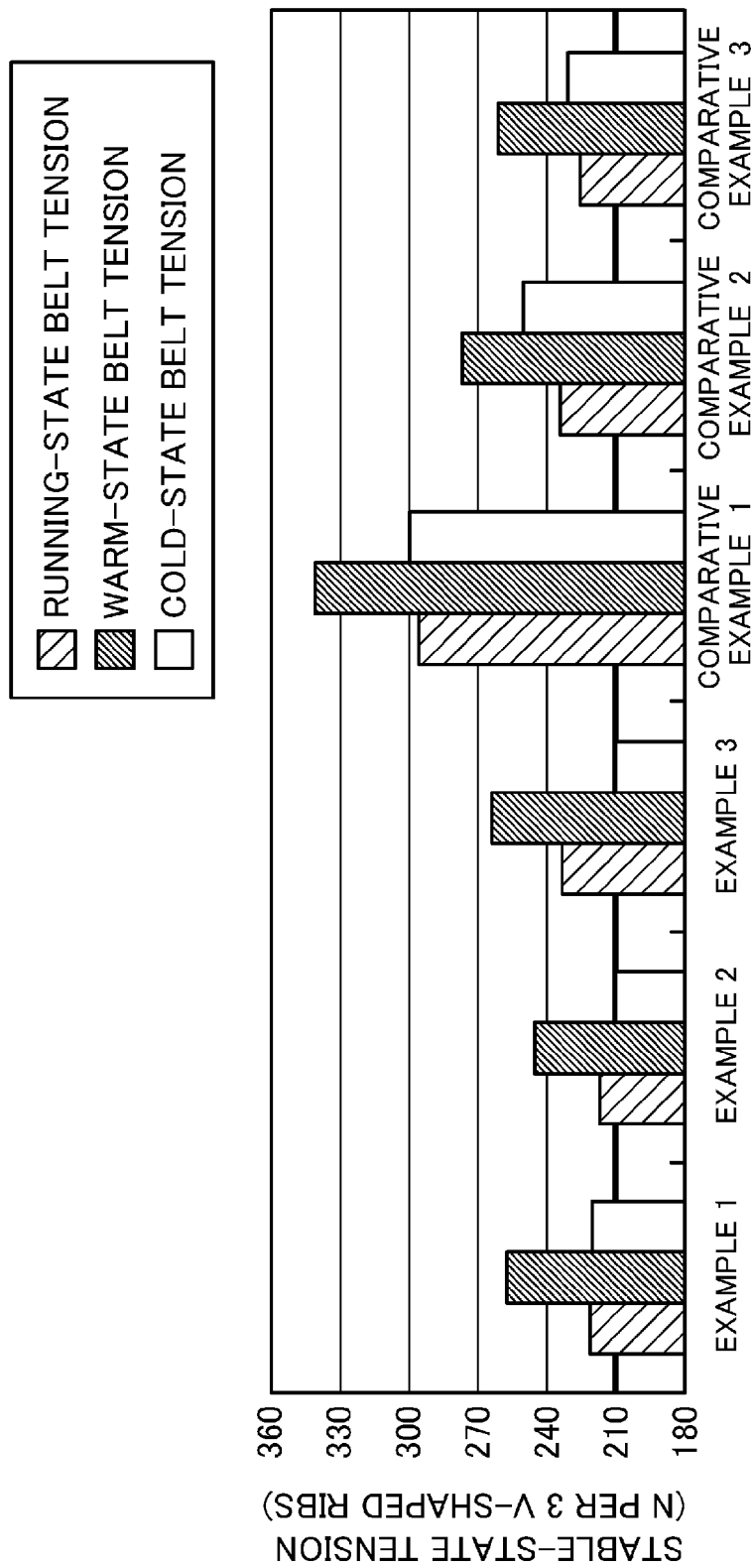
FIG. 15 is a graph showing the running-state belt tension, the warm-state belt tension, and the cold-state belt tension in each of examples 1-3 and comparative examples 1-3.

FIG. 15 shows the running-state belt tension, the warm-state belt tension, and the cold-state belt tension for each of the first to third examples and the first to third comparative examples.

The above V-ribbed belt is designed such that the cold-state belt tension is 210 N per three V-shaped ribs. In the first to third examples in which the belt temperature after running was higher than the glass transition temperature of the nylon 66 fibers, the measured values are close to the design value, and almost the same as the design value especially in the second and third examples. On the other hand, in the first to third comparative examples in which the belt temperature after running was lower than the glass transition temperature of the nylon 66 fibers, the measured values are higher than the design value by about 10 to 50%.

This may be because the temperature of the V-ribbed belt is increased to a temperature higher than the glass transition temperature of the nylon 66 fibers forming the cord, and a reduction in the belt tension due to initial creep of the V-ribbed belt is thereby accelerated, and as a result, the reduction in belt tension is removed in a short time, and the belt tension is stabilized.

By setting the temperature of the V-ribbed belt to a temperature higher than the glass transition temperature of the organic fibers forming the cord, the belt tension at that moment can be easily inspected as the stable-state tension with high accuracy.

(Second Test Evaluation)

V-ribbed belts were formed by the same method as the first fabrication method of the above embodiment, with a tension applied to a cord in helically winding the cord around the cylindrical mold being varied to 9.8 N per cord (0.0017 N/dtex), 14.7 N per cord (0.0026 N/dtex), and 29.4 N per cord (0.0052 N/dtex). Each of the obtained V-ribbed belts has a length of 856 mm, a thickness of 4.3 mm, and a width of 10 mm with three ribs. In each of the obtained V-ribbed belts, the cord made of nylon 66 fibers (Leona, plied yarn of 940 dtex/2×3 produced by Asahi Kasei Corp., having a glass transition temperature of 50° C.) was used.

The V-ribbed belts having cords which had been wound around the cylindrical mold with different tensions were measured for belt tensions in warm state as stable-state tensions by the similar method as described in the first example of the first evaluation test.

Figure 16:
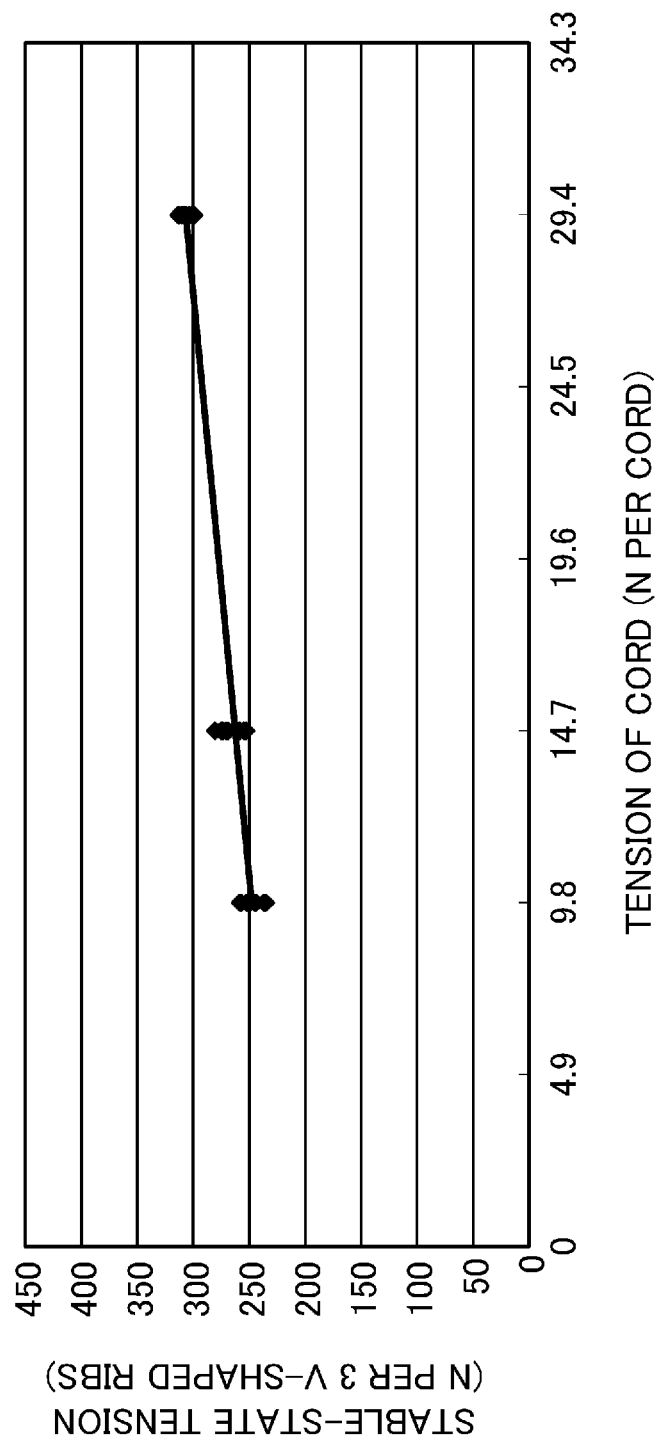
FIG. 16 is a graph showing a relationship between a tension in helically winding the cord around a cylindrical mold and stable-state tension of the V-ribbed belt.

FIG. 16 shows a relationship between a tension in winding the cord around the cylindrical mold and a stable-state tension.

According to the graph, there are correlations between the tensions in winding the cord around the cylindrical mold and the stable-state tensions, and the higher the tension of the cord, the higher the stable-state tension. The regression equation of these relationships is as follows:

$$\text{(stable-state tension)}=29.623\times\text{(tension of cord}/9.8)+218.06 \qquad (1)$$

(Third Evaluation Test)

A V-ribbed belt was formed by the same method as the first fabrication method of the above embodiment, with a tension applied to a cord in helically winding the cord around the cylindrical mold being 19.6 N per cord (0.0035 N/dtex). The obtained V-ribbed belt has a length of 862 mm, a thickness of 4.3 mm, and a width of 10 mm with three ribs. Further, in the obtained V-ribbed belt, the cord made of nylon 66 fibers (Leona, plied yarn of 940 dtex/2×3 produced by Asahi Kasei Corp., having a glass transition temperature of 50° C.) was used.

The V-ribbed belt having a cord which had been wound around the cylindrical mold with a tension of 19.6 N per cord (0.0035 N/dtex) was measured for a cold-state belt tension as a stable-state tension by the similar method as described in the first example of the first evaluation test (with the center distance of 280 mm), and the result was 217 N per three V-shaped ribs.

In the regression equation (1) obtained in the second test evaluation, the stable-state tension is a warm-state belt tension. Assuming that the dependency of the stable-state tension on the tension of the cord also applies to the case where the stable-state tension is a cold-state belt tension, the following equation holds when forming a V-ribbed belt of which the stable-state tension is 199 N per three V-shaped ribs:

$$(217-199)/29.623\times9.8=18/29.623\times9.8\approx5.9(N/\text{cord})$$

This means that the tension in winding the cord around the cylindrical mold may be decreased by 5.9 N per cord to 13.7 N per cord (0.0024 N/dtex).

Figure 17:
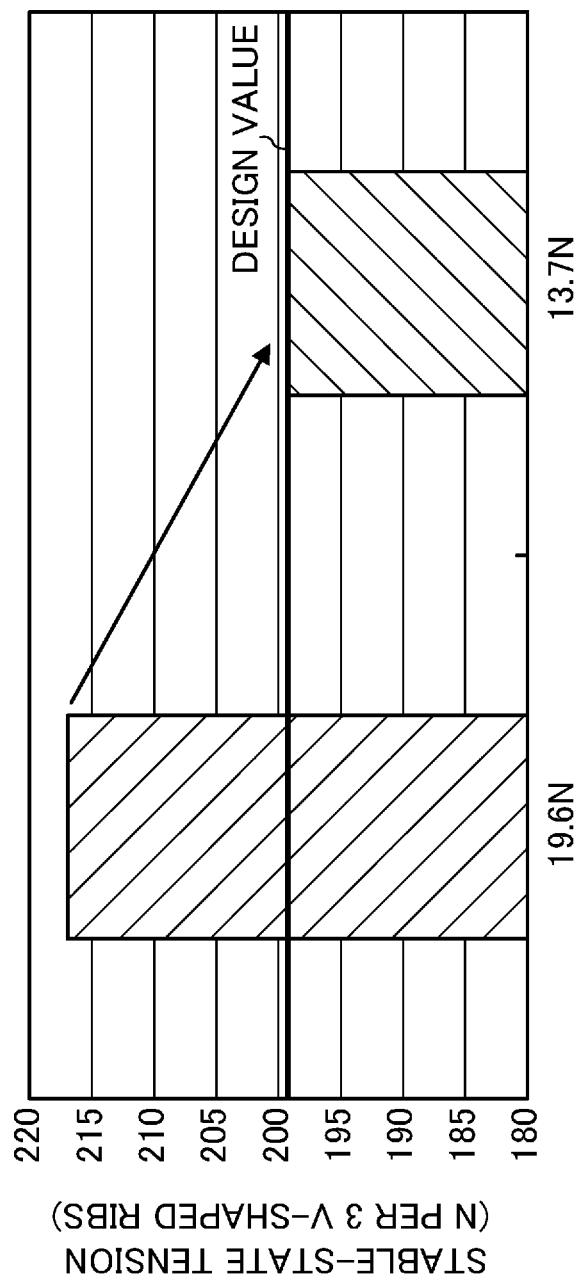
FIG. 17 is a graph showing the stable-state tension of the V-ribbed belt in the case where the tension applied to the cord in helically winding around the cylindrical mold is 19.6 N and 13.7 N.

In view of this, a V-ribbed belt was formed by the same method as described above, with the tension in helically winding the cord around the cylindrical mold being 13.7 N per cord (0.0024 N/dtex). The stable-state tension of the obtained V-ribbed belt was measured in the similar manner, and the result was 199 N per three V-shaped ribs as designed as shown in FIG. 17.

The present disclosure is useful as a method for measuring a stable-state tension of a power transmission belt and a device for measuring the stable-state tension of the power transmission belt, and a method for forming a power transmission belt using the method and the device.

The embodiment has been described above as an example technique of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiment described above is intended to illustrate the technique in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A method for measuring a stable-state tension of an endless power transmission belt including a belt body made of rubber in which a cord made of a carbon-based fiber is embedded comprising:
   winding the power transmission belt around a plurality of pulleys,
   increasing a belt temperature to a temperature higher than a glass transition temperature of the carbon-based fiber forming the cord by 20° C. or more, and
   measuring a belt tension of the power transmission belt wound around the plurality of pulleys as a stable-state tension.

2. The method of claim 1, wherein the belt tension of the power transmission belt is measured while the belt temperature is higher than the glass transition temperature of the carbon-based fiber forming the cord and the power transmission belt wound around the plurality of pulleys is in stationary state.

3. The method of claim 1, wherein the belt temperature of the power transmission belt is higher than the glass transition temperature of the carbon-based fiber forming the cord by 20 to 50° C.

4. The method of claim 1, wherein the carbon-based fiber forming the cord is an aliphatic polyamide fiber.

5. The method of claim 1, wherein the plurality of pulleys are a pair of pulleys each having a same diameter.

6. A method for measuring a stable-state tension of an endless power transmission belt including a belt body made of rubber in which a cord made of a carbon-based fiber is embedded comprising:
   winding the power transmission belt around a plurality of pulleys,
   increasing a belt temperature to a temperature higher than a glass transition temperature of the carbon-based fiber forming the cord, and
   measuring a belt tension of the power transmission belt wound around the plurality of pulleys as a stable-state tension,
   wherein the belt tension of the power transmission belt is measured while the belt temperature is higher than the glass transition temperature of the carbon-based fiber forming the cord and during the power transmission belt wound around the plurality of pulleys is running for a predetermined period of time.

7. A method for measuring a stable-state tension of an endless power transmission belt including a belt body made of rubber in which a cord made of a carbon-based fiber is embedded comprising:
   winding the power transmission belt around a plurality of pulleys,
   increasing a belt temperature to a temperature higher than a glass transition temperature of the carbon-based fiber forming the cord, and
   measuring a belt tension of the power transmission belt wound around the plurality of pulleys as a stable-state tension,
   wherein the belt tension of the power transmission belt is measured while the belt temperature is higher than the glass transition temperature of the carbon-based fiber forming the cord and after the power transmission belt wound around the plurality of pulleys is running for a predetermined period of time.

8. The method of claim 7, wherein the predetermined period of time when the power transmission belt is made to run is 0.5 to 5 minutes.

9. The method of claim 7, wherein the belt tension of the power transmission belt is measured after the power transmission belt is cooled.

10. The method of claim 9, wherein the belt tension of the power transmission belt is measured when the belt temperature of the power transmission belt is 10 to 40° C.

11. A device for measuring a stable-state tension of a power transmission belt which is used to measure a stable-state tension of an endless power transmission belt including a belt body made of rubber in which a cord made of a carbon-based fiber is embedded, comprising:
   a heating bath at which a temperature-control mechanism is provided;
   a plurality of pulleys provided in the heating bath such that the power transmission belt can be wound around the plurality of pulleys; and
   a belt tension detection mean configured to detect a belt tension of the power transmission belt wound around the plurality of pulleys,
   wherein the power transmission belt wound around the plurality of pulleys is capable of running through the heating bath.

12. The device of claim 11, wherein the plurality of pulleys are a pair of pulleys each having a same diameter.

13. A method for forming an endless power transmission belt including a belt body made of rubber in which a cord made of a carbon-based fiber is embedded, the method comprising:
   helically winding the cord around an outer circumference of a cylindrical mold, with a predetermined tension applied to the cord;
   winding an uncrosslinked rubber composition around the cylindrical mold;
   heating and pressing the cord and the uncrosslinked rubber composition positioned on the cylindrical mold to vulcanize;
   molding the cord and the uncrosslinked rubber composition into a cylindrical belt slab; and
   increasing a belt temperature of the power transmission belt formed from the belt slab obtained higher than a glass transition temperature of the carbon-based fiber forming the cord, with the power transmission belt wound around a plurality of pulleys; and
   measuring a belt tension of the power transmission belt wound around the plurality of pulleys as a stable-state tension.

14. The method of claim 13, wherein the predetermined tension applied to the cord is modified based on the measured stable-state tension.

* * * * *